(12) United States Patent
Chen et al.

(10) Patent No.: US 12,009,666 B2
(45) Date of Patent: Jun. 11, 2024

(54) METHOD AND SYSTEM FOR GRID CONNECTION MANAGEMENT OF RENEWABLE ENERGY GENERATION

(71) Applicants: HUANENG HUBEI NEW ENERGY CO., LTD., Wuhan (CN); HUANENG SUIXIAN JIESHAN WIND POWER CO., LTD, Suizhou (CN)

(72) Inventors: Yingjie Chen, Wuhan (CN); Ge Peng, Wuhan (CN); Hao Bian, Wuhan (CN); Jun Zhang, Wuhan (CN); Lei Tian, Wuhan (CN); Linchuan Li, Wuhan (CN)

(73) Assignees: HUANENG HUBEI NEW ENERGY CO., LTD., Wuhan (CN); HUANENG SUIXIAN JIESHAN WIND POWER CO., LTD, Suizhou (CN)

( * ) Notice: Subject to any disclaimer, the term of this patent is extended or adjusted under 35 U.S.C. 154(b) by 0 days.

(21) Appl. No.: 18/075,440

(22) Filed: Dec. 6, 2022

(65) Prior Publication Data
US 2024/0154426 A1 May 9, 2024

(30) Foreign Application Priority Data
Oct. 31, 2022 (CN) .......................... 202211353856.8

(51) Int. Cl.
H02J 3/38 (2006.01)

(52) U.S. Cl.
CPC ........... *H02J 3/381* (2013.01); *H02J 2203/10* (2020.01)

(58) Field of Classification Search
CPC .............................. H02J 3/381; H02J 2203/10
See application file for complete search history.

(56) References Cited

U.S. PATENT DOCUMENTS

| | | | |
|---|---|---|---|
| 2015/0357818 A1* | 12/2015 | Wang | H02J 13/00034 307/52 |
| 2020/0161863 A1* | 5/2020 | Yang | H02J 3/46 |

\* cited by examiner

*Primary Examiner* — Joseph Ortega

(57) ABSTRACT

Disclosed is a method and system for grid connection management of renewable energy generation, the method comprises: obtaining operating condition data of a first power supply, a second power supply, a power grid, and a load in a preset period; establishing a first optimal control model according to the first condition data, and establishing a second optimal control model; monitoring grid connection management status of the first optimal control model and the second optimal control model; analyzing stability when the first optimal control model is switched to the second optimal control model. The beneficial effects of this disclosure are: completing the switch from the first optimal control model to the second optimal control model in the renewable energy generation grid connection management, which improves the smoothness of control model switching under different load conditions in the renewable energy generation process.

9 Claims, 3 Drawing Sheets

METHOD AND SYSTEM FOR GRID CONNECTION MANAGEMENT OF RENEWABLE ENERGY GENERATION

FIELD OF THE DISCLOSURE

The disclosure relates to the technical field of grid connection, in particular to a method and system for grid connection management of renewable energy generation.

BACKGROUND

Power grid is composed of various voltage substations and their transmission and distribution lines in the power system. Grid connection is to merge power grids together as the name implies. Grid connection of renewable energy mainly includes two forms: incorporating wind power and photovoltaic power generation into main network, and incorporating distributed power into the distribution network. China's rich wind and solar energy resources are mainly located in the three northern regions. Renewable energy generation is mostly at the end of the power grid. The power supply structure is relatively simple, and the grid structure of the power grid is weak and the adjustment ability is limited grid connection of renewable energy electric grids such as wind power and photovoltaic is controlled by power electronic converters.

The proportion of renewable energy such as wind power and solar power on the power supply side is getting higher and higher. Due to the influence of various irresistible natural factors such as climate and topography, wind power and photovoltaic power generation have seasonal, time-varying fluctuations and random characteristics in the time dimension. Large-scale grid connection makes the power balance show obvious spatial and time imbalance, which makes the power grid have to configure more backup powers and peak shaving capacity, and the phenomenon of abandoning wind power and solar power is common.

SUMMARY

The purpose of this disclosure is to provide a method and system for grid connection management of renewable energy generation to overcome the above technical problems.

This disclosure provides a method for grid connection management of renewable energy generation, comprising:
S1, obtaining operating condition data of a first power supply, a second power supply, a power grid, and a load in a preset period, and dividing the operating condition data into first condition data and second condition data;
S2, establishing a first optimal control model according to the first condition data, and establishing a second optimal control model according to the second condition data; the first optimal control model includes a first model objective function, and the second optimal control model includes a second model objective function;
S3, monitoring grid connection management status of the first optimal control model and the second optimal control model, and a monitoring result is obtained;
S4, analyzing stability when the first optimal control model is switched to the second optimal control model through a preset algorithm according to the monitoring result, and an analysis result is obtained; completing a switch from the first optimal control model to the second optimal control model in renewable energy generation grid connection management according to the analysis result.

This disclosure also provides a system for grid connection management of renewable energy generation, comprising:
a status acquisition unit, which is used to obtain operating condition data of a first power supply, a second power supply, a power grid, and a load in a preset period, and divide the operating condition data into first condition data and second condition data;
a control unit, which is used to establish a first optimal control model according to the first condition data, and establish a second optimal control model according to the second condition data; the first optimal control model includes a first model objective function, and the second optimal control model includes a second model objective function;
a monitoring unit, which is used to monitor grid connection management status of the first optimal control model and the second optimal control model, and a monitoring result is obtained;
an analysis and switching unit, which is used to analyze stability when the first optimal control model is switched to the second optimal control model through a preset algorithm according to the monitoring result, and an analysis result is obtained; and the analysis and switching unit is also used to complete a switch from the first optimal control model to the second optimal control model in renewable energy generation grid connection management according to the analysis result.

Compared with the prior art, the beneficial effects of this disclosure are: this disclosure monitors the grid connection management status of the first optimal control model and the second optimal control model, and analyzes the stability when the first optimal control model is switched to the second optimal control model through a preset algorithm according to the monitoring results; According to the analysis results, completing the switch from the first optimal control model to the second optimal control model in the renewable energy generation grid connection management, which improves the smoothness of control model switching under different load conditions in the renewable energy generation process, and can also meet the requirements of fine management of the first power supply and the second power supply under different working conditions.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
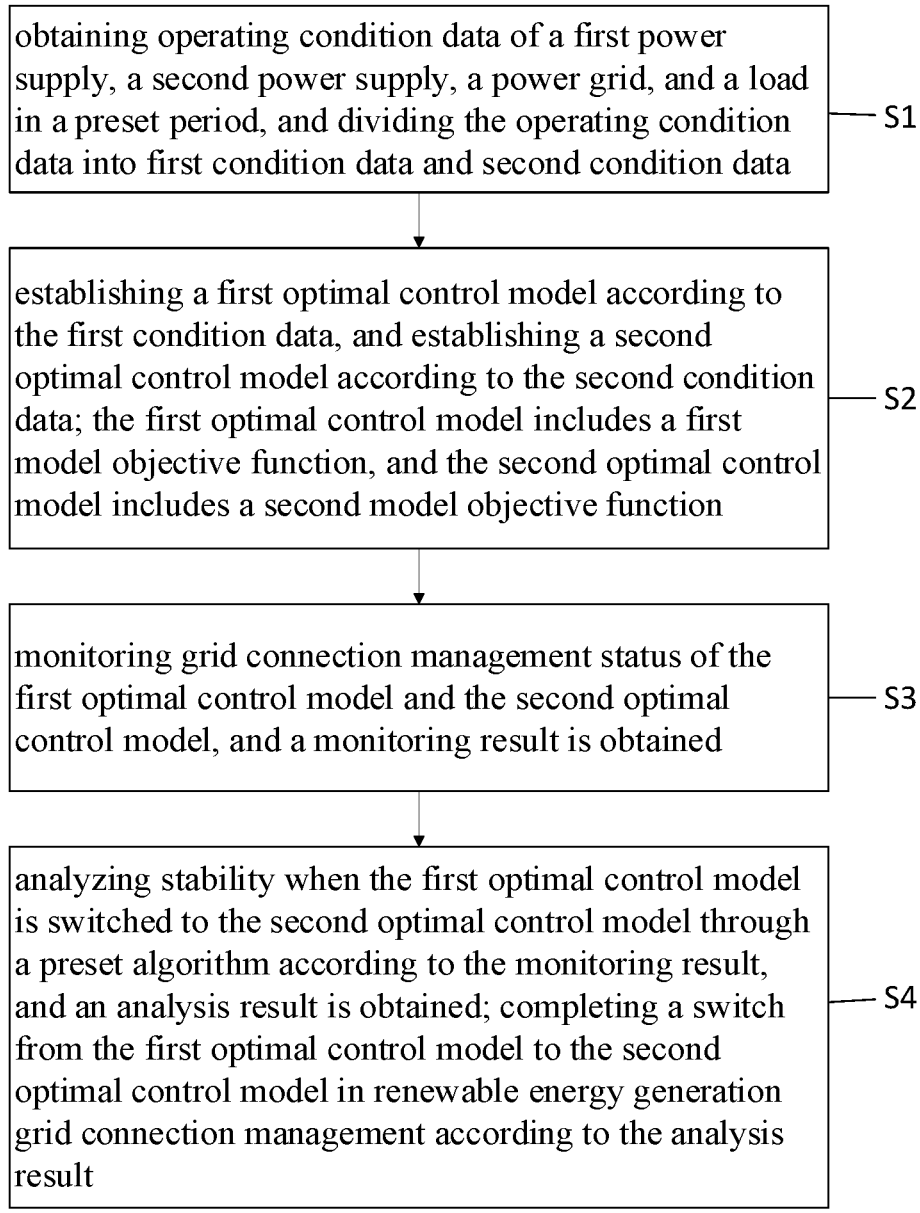
FIG. 1 is a flowchart of the method for grid connection management of renewable energy generation provided by this disclosure embodiment.
Figure 2:
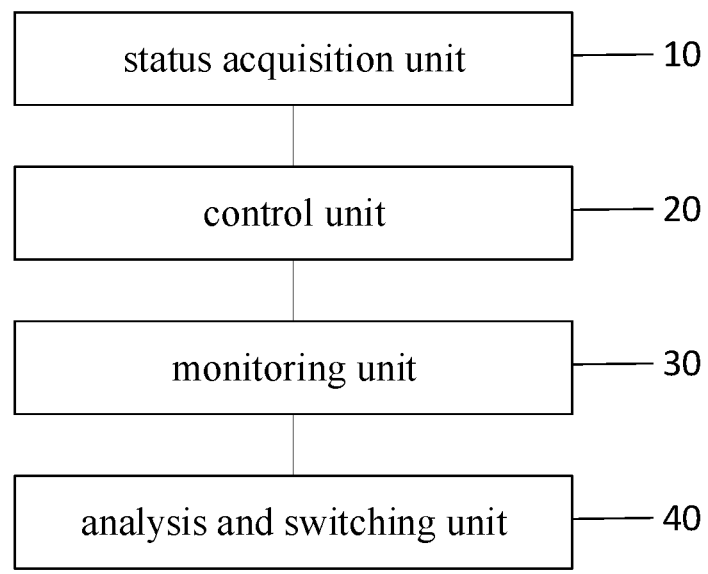
FIG. 2 is a structure diagram of the system for grid connection management of renewable energy generation provided by this disclosure embodiment.
Figure 3:
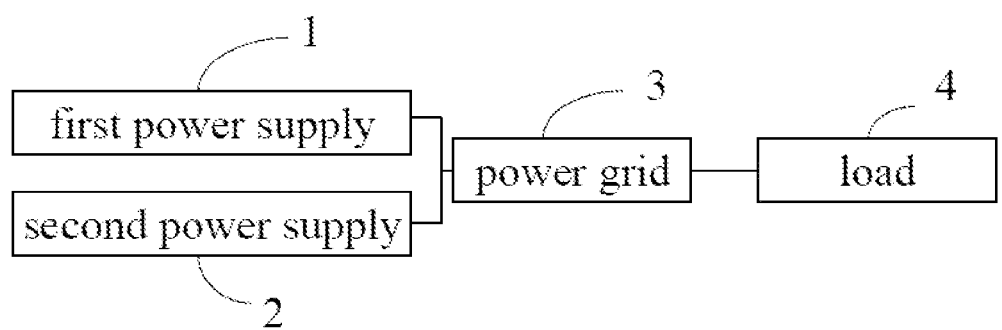
FIG. 3 is a structure diagram of an embodiment of a power supply system.

The technical solutions in the embodiments of the application will be described clearly and completely in combination with the drawings in the embodiments of the application.

Embodiment 1

In the first aspect, this disclosure provides a method for grid connection management of renewable energy generation, the method comprises:

S1, obtaining operating condition data of a first power supply 1, a second power supply 2, a power grid 3, and a load 4 in a preset period, and dividing the operating condition data into first condition data and second condition data.

In this disclosure, the first power supply is a conventional power supply, such as thermal power station; the second power supply is a renewable energy power supply, such as photovoltaic power station and wind power station. The purpose of obtaining the operating condition data of the first power supply, the second power supply, the power grid, and the load in a preset time period and dividing the operating condition data into first condition data and second condition data is to establish the control model of the first power supply and the second power supply under different functional conditions to make the control more precise. Different conditions refer to the power consumption at the load end.

S2, establishing a first optimal control model according to the first condition data, and establishing a second optimal control model according to the second condition data; the first optimal control model includes a first model objective function, and the second optimal control model includes a second model objective function.

By establishing the first optimal control model and the second optimal control model respectively, the working condition control is more refined.

S3, monitoring grid connection management status of the first optimal control model and the second optimal control model, and a monitoring result is obtained.

By implementing step S3, the effect of grid connection of the second power supply can be monitored through the first optimal control model and the second optimal control model, and a monitoring result can be obtained.

S4, analyzing stability when the first optimal control model is switched to the second optimal control model through a preset algorithm according to the monitoring result, and an analysis result is obtained; completing a switch from the first optimal control model to the second optimal control model in renewable energy generation grid connection management according to the analysis result.

The significance of implementing step S4 is to complete the switch from the first optimal control model to the second optimal control model in the renewable energy generation grid connection management through the monitoring result obtained in step S3, which can achieve smooth switch between different models under different working conditions.

Furthermore, in the step S1, the operating condition data is divided into first condition data and second condition data according to situation of the load, wherein the first condition data is working condition data under a first load, and the second condition data is working condition data under a second load, and the first load is greater than the second load.

The first load is greater than the second load, in an actual application scenario, through the analysis and statistics of historical data, the laws of domestic and production power consumption can be obtained, although the rule prompts that the power load fluctuation cannot be completely accurate, the load level can be displayed in a rough range. When the power grid is relatively idle, the second optimal control model is used for grid connection management of renewable energy generation. When the power grid is relatively heavy, the first optimal control model is used for grid connection management of renewable energy generation. In this way, different optimization control models have different control priorities, which can better meet the actual power demand.

Furthermore, the first power supply is a conventional power station power supply, and the second power supply is a renewable energy power supply.

Furthermore, the first optimal control model in step S2 is as follows:

$$f_1 = \alpha \text{cost} + \beta \Sigma_{m=1}^{M} \Sigma_{i=1}^{N} P^m (C_u u_i^{m,t} + C_d d_i^{m,t}),$$

where cost is the total cost value of the first power supply and the second power supply under the first condition data, and m is quantity value of the second power supply under different operation status under the first condition data, where m=1, 2, ..., M, M is total number of operation status; N is total number of units in the first power supply, i represents an i-th unit, where i=1, 2, ..., N; $u_i^{m,\,t}$ is a positive feedback value of output of the i-th unit in a t period under a m-th operation status, $d_i^{m,t}$ is a negative feedback value of output of the i-th unit in the t period under the m-th operation status, $C_u$ is adjustment coefficient of the positive feedback value of the output, $C_d$ is adjustment coefficient of the negative feedback value of the output, $P^m$ is power generated under the m-th operation status of the second power supply, $\alpha$ is a coefficient corresponding to cost, and $\beta$ is power adjustment coefficient under the first condition data, value of $\beta$ is adjustable.

In this embodiment, by setting cost as the total cost value of first power supply and the second power supply under the first condition data, the regulation potential of the first power supply for balancing the second power supply under different operating conditions is established under the first condition data, where the cost optimization of the units participating in the regulation of output in the first power supply and the number of grid connected units in the second power supply is taken as one of the parameters. The potential of the power grid can be further explored by using $\alpha$ as the cost corresponding coefficient and $\beta$ as the power regulation coefficient under the first condition data. It realizes grid connection management regulation under the first condition data by adjusting the values of $\alpha$ and $\beta$.

Furthermore, the second optimal control model in step S2 is as follows:

$$f_2 = \phi \text{comp} + \lambda \Sigma_{q=1}^{Q} \Sigma_{i=1}^{N} P^q (C_u u_i^{q,t} + C_d d_i^{q,t}),$$

where comp is cost value of the first power supply, the second power supply, and the load under the second condition data, and q is the quantity value of second power supply in different operation status under the second condition data, where q=1, 2, ..., Q, Q is the total number of operation status; N is total number of units in the first power supply, i represents an i-th unit, where i=1, 2, ..., N; $u_i^{q,\,t}$ is a positive output feedback value of the i-th unit in a period t under a q-th operation status, $d_i^{q,t}$ is a negative output feedback value of the i-th unit in the period t under the q-th operation status, $C_u$ is an adjustment coefficient of the positive output feedback value, $C_d$ is the adjustment coefficient of the negative output feedback value, $P^q$ is generating power under the q-th operation status, $\phi$ is a coefficient corresponding to comp, $\lambda$ is a power adjustment coefficient under the second condition data.

In this embodiment, under the second condition, by setting comp as the cost values of the first power supply, the second power supply, and the load under second condition data, more load ends will be encouraged to participate in power grid connection mediation, and the cost of the first power supply participating in mediation will be reduced. Adjusting the value of $\phi$ and $\lambda$ to realize the grid connection management adjustment under the second condition data.

Furthermore, in step S4, analyzing stability when the first optimal control model is switched to the second optimal control model through a preset algorithm according to the monitoring result includes:

Filtering results of the grid connection management status of the first optimal control model, and taking J acquisition results in the switching period obtained from the filtering as a first matrix J; filtering results of the grid connection management status of the second optimal control model, and taking K acquisition results in the switching period obtained by filtering as a second matrix K;

The corresponding model of the preset algorithm is as follows:

$$F = \frac{\sum_{j=1}^{J} J \sum_{k=1}^{K} K}{J * K},$$

where j=1, 2, . . . , J, k=1, 2, . . . , K, F represents the smoothness of the grid connection management status when switching from the first optimal control model to the second optimal control model.

In this embodiment, it is mainly to solve the switch from the first optimal control model to the second optimal control model in the renewable energy generation grid connection management, so as to achieve the smoothness of switching between different models under different working conditions.

Through the results of the first optimal control model's grid connection management status and the second optimal control model's grid connection management status in the switching period, and through the F value of the preset algorithm corresponding to the model, under different values of $\alpha,\beta$, $\phi$ and $\lambda$, the values of $\alpha$, $\beta$, $\phi$, and $\lambda$ in the first optimal control model and the second optimal control model in the switching period are adjusted to improve the switching smoothness.

Embodiment 2

On the other aspect, the embodiment of this disclosure also provides a system for grid connection management of renewable energy generation, which comprises:

a status acquisition unit 10, which is used to obtain operating condition data of a first power supply, a second power supply, a power grid, and a load in a preset period, and divide the operating condition data into first condition data and second condition data;
a control unit 20, which is used to establish a first optimal control model according to the first condition data, and establish a second optimal control model according to the second condition data; the first optimal control model includes a first model objective function, and the second optimal control model includes a second model objective function;
a monitoring unit 30, which is used to monitor grid connection management status of the first optimal control model and the second optimal control model, and a monitoring result is obtained;
an analysis and switching unit 40, which is used to analyze stability when the first optimal control model is switched to the second optimal control model through a preset algorithm according to the monitoring result, and an analysis result is obtained; and the analysis and switching unit 40 is also used to complete a switch from the first optimal control model to the second optimal control model in the renewable energy generation grid connection management according to the analysis result.

Furthermore, in the status acquisition unit 10, the operating condition data is divided into first condition data and second condition data according to situation of the load, wherein the first condition data is working condition data under a first load, and the second condition data is working condition data under a second load, and the first load is greater than the second load.

The first power supply is a conventional power station power supply, and the second power supply is a renewable energy power supply.

Furthermore, in the control unit 20, the first optimal control model in step S2 is as follows:

$$f_1 = \alpha \text{cost} + \beta \Sigma_{m=1}^{M} \Sigma_{i=1}^{N} P^m (C_u u_i^{m,t} + C_d d_i^{m,t}),$$

where cost is the total cost value of the first power supply and the second power supply under the first condition data, and m is quantity value of the second power supply under different operation status under the first condition data, where m=1, 2, . . . , M, M is total number of operation status; N is total number of units in the first power supply, i represents an i-th unit, where i=1, 2, . . . , N; $u_i^{m,t}$ is a positive feedback value of output of the i-th unit in a t period under a m-th operation status, $d_i^{m,t}$ is a negative feedback value of output of the i-th unit in the t period under the m-th operation status, $C_u$ is adjustment coefficient of the positive feedback value of the output, $C_d$ is adjustment coefficient of the negative feedback value of the output, $P^m$ is power generated under the m-th operation status of the second power supply, $\alpha$ is a coefficient corresponding to cost, and $\beta$ is power adjustment coefficient under the first condition data, value of $\beta$ is adjustable.

Furthermore, the second optimal control model is as follows:

$$f_2 = \phi \text{comp} + \lambda \Sigma_{q=1}^{Q} \Sigma_{i=1}^{N} P^q (C_u u_i^{q,t} + C_d d_i^{q,t}),$$

where comp is cost value of the first power supply, the second power supply, and the load under the second condition data, and q is the quantity value of second power supply in different operation status under the second condition data, where q=1, 2, . . . , Q, Q is the total number of operation status; N is total number of units in the first power supply, i represents an i-th unit, where i=1, 2, . . . , N; $u_i^{q,t}$ is a positive output feedback value of the i-th unit in a period t under a q-th operation status, $d_i^{q,t}$ is a negative output feedback value of the i-th unit in the period t under the q-th operation status, $C_u$ is an adjustment coefficient of the positive output feedback value, $C_d$ is the adjustment coefficient of the negative output feedback value, $P^q$ is generating power under the q-th operation status, $\phi$ is a coefficient corresponding to comp, $\lambda$ is a power adjustment coefficient under the second condition data.

Furthermore, in analysis and switching unit 40, analyzing stability when the first optimal control model is switched to the second optimal control model through a preset algorithm according to the monitoring result includes:

Filtering results of the grid connection management status of the first optimal control model, and taking J acquisition results in the switching period obtained from the filtering as a first matrix J; filtering results of the grid connection management status of the second optimal control model, and taking K acquisition results in the switching period obtained by filtering as a second matrix K;

The corresponding model of the preset algorithm is as follows:

$$F = \frac{\sum_{j=1}^{J} J \sum_{k=1}^{K} K}{J * K},$$

where j=1, 2, . . . J, k=1, 2, . . . , K, F represent the smoothness of the grid connection management status when switching from the first optimal control model to the second optimal control model.

This disclosure has the following advantages over the prior art:

This disclosure monitors the grid connection management status of the first optimal control model and the second optimal control model, and analyzes the stability when the first optimal control model is switched to the second optimal control model through a preset algorithm according to the monitoring results; According to the analysis results, completing the switch from the first optimal control model to the second optimal control model in the renewable energy generation grid connection management, which improves the smoothness of control model switching under different load conditions in the renewable energy generation process, and can also meet the requirements of fine management of the first power supply and the second power supply under different working conditions.

The algorithm and display provided herein are not inherently related to any particular computer, virtual system, or other device. Various common systems can also be used based on this. According to the above description, the structure required to construct such a system is obvious. In addition, this disclosure is not specific to any specific programming language. It should be understood that various programming languages can be used to implement the content of this disclosure described here, and the description of specific languages is to disclose the best implementation of this disclosure.

The various embodiments of this disclosure can be implemented in hardware, software modules running on one or more processors, or a combination of them. Those skilled in the art should understand that a microprocessor or digital signal processor (DSP) can be used in practice to realize some or all functions of some or all components of the thermal simulation device and electronic equipment of the aluminum substrate according to the embodiment of this disclosure. This disclosure can also be implemented as a device or device program (e.g., a computer program and a computer program product) for executing part or all of the methods described herein. Such a program implementing this disclosure can be stored on a computer-readable medium, or it can be in the form of one or more signals. Such signals can be downloaded from the internet, or provided on carrier signals, or provided in any other form.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for a grid connection management of a renewable energy generation, comprising:

S1, obtaining an operating condition data of a first power supply, a second power supply, a power grid, and a load in a preset period, and dividing the operating condition data into first a condition data and a second condition data;

S2, establishing a first optimal control model according to the first condition data, and establishing a second optimal control model according to the second condition data; the first optimal control model includes a first model objective function, and the second optimal control model includes a second model objective function;

S3, monitoring a grid connection management status of the first optimal control model and the second optimal control model, and a monitoring result is obtained;

S4, analyzing stability when the first optimal control model is switched to the second optimal control model through a preset algorithm according to the monitoring result, and an analysis result is obtained; completing a switch from the first optimal control model to the second optimal control model according to the analysis result;

wherein the first optimal control model in the step S2 is as follows:

$$f_1 = \alpha \text{cost} + \beta \Sigma_{m=1}^{M} \Sigma_{i=1}^{N} P^m (C_u u_i^{m,t} + C_d d_i^{m,t}),$$

where cost is a total cost value of the first power supply and the second power supply under the first condition data, and m is a quantity value of the second power supply under different operation status under the first condition data, where m=1, 2, . . . , M, M is a total number of operation status; N is a total number of units in the first power supply, i represents an i-th unit, where i=1, 2, . . . , N; $u_i^{m,t}$ is a positive feedback value of output of the i-th unit in a t period under a m-th operation status, $d_i^{m,t}$ is a negative feedback value of output of the i-th unit in the t period under the m-th operation status, $C_u$ is an adjustment coefficient of the positive feedback value of the output, $C_d$ is an adjustment coefficient of the negative feedback value of the output, $P^m$ is a power generated under the m-th operation status of the second power supply, $\alpha$ is a coefficient corresponding to cost, and $\beta$ is a power adjustment coefficient under the first condition data.

2. The method for the grid connection management of the renewable energy generation according to claim 1, in the step S1, the operating condition data is divided into the first condition data and the second condition data according to a situation of the load, wherein the first condition data is a working condition data under a first load, and the second condition data is a working condition data under a second load, and the first load is greater than the second load.

3. The method for the grid connection management of the renewable energy generation according to claim 2, the first power supply is a conventional power station power supply, and the second power supply is a renewable energy power supply.

4. The method for the grid connection management of the renewable energy generation according to claim 1, the second optimal control model in the step S2 is as follows:

$$f_2 = \phi comp + \lambda \Sigma_{q=1}^{Q} \Sigma_{i=1}^{N} P^q (C_u u_i^{q,t} + C_d d_i^{q,t}),$$

where comp is a cost value of the first power supply, the second power supply, and the load under the second condition data, and q is a quantity value of the second power supply in different operation status under the second condition data, where q=1, 2, . . . , Q, Q is a total number of operation status; N is a total number of units in the first power supply, i represents an i-th unit, where i=1, 2, . . . , N; $u_i^{q,t}$ is a positive output feedback value of the i-th unit in a period t under a q-th operation status, $d_i^{q,t}$ is a negative output feedback value of the i-th unit in the period t under the q-th operation status, $C_u$ is an adjustment coefficient of the positive output feedback value, $C_d$ is an adjustment coefficient of the negative output feedback value, $P^q$ is a generating power under the q-th operation status, $\phi$ is a coefficient corresponding to comp, $\lambda$ is a power adjustment coefficient under the second condition data.

5. The method for the grid connection management of renewable energy generation according to claim 4, in the step S4, analyzing stability when the first optimal control model is switched to the second optimal control model through a preset algorithm according to the monitoring result includes:
filtering results of the grid connection management status of the first optimal control model, and taking J acquisition results in the switching period obtained from the filtering as a first matrix J; filtering results of the grid connection management status of the second optimal control model, and taking K acquisition results in the switching period obtained by filtering as a second matrix K;
corresponding model of the preset algorithm is as follows:

$$F = \frac{\Sigma_{j=1}^{J} J \Sigma_{k=1}^{K} K}{J * K},$$

where j=1, 2, . . . , J, k=1, 2, . . . , K, F represents a smoothness of the grid connection management status when switching from the first optimal control model to the second optimal control model.

6. A system for a grid connection management of a renewable energy generation, comprising:
a status acquisition unit, configured to obtain an operating condition data of a first power supply, a second power supply, a power grid, and a load in a preset period, and divide the operating condition data into the first condition data and the second condition data;
a control unit, configured to establish a first optimal control model according to the first condition data, and establish a second optimal control model according to the second condition data; the first optimal control model includes a first model objective function, and the second optimal control model includes a second model objective function;
a monitoring unit, configured to monitor grid connection management status of the first optimal control model and the second optimal control model, and a monitoring result is obtained;
an analysis and switching unit, configured to analyze stability when the first optimal control model is switched to the second optimal control model through a preset algorithm according to the monitoring result, and an analysis result is obtained; and the analysis and switching unit is also configured to complete a switch from the first optimal control model to the second optimal control model according to the analysis result;
wherein the first optimal control model is as follows:

$$f_1 = \alpha cost + \beta \Sigma_{m=1}^{M} \Sigma_{i=1}^{N} P^m (C_u u_i^{m,t} + C_d d_i^{m,t}),$$

where cost is a total cost value of the first power supply and the second power supply under the first condition data, and m is a quantity value of the second power supply under different operation status under the first condition data, where m=1, 2, . . . , M, M is a total number of operation status; N is a total number of units in the first power supply, i represents an i-th unit, where i=1, 2, . . . , N; $u_i^{m,t}$ is a positive feedback value of output of the i-th unit in a t period under a m-th operation status, $d_i^{m,t}$ is a negative feedback value of output of the i-th unit in the t period under the m-th operation status, $C_u$ is an adjustment coefficient of the positive feedback value of the output, $C_d$ is an adjustment coefficient of the negative feedback value of the output, $P^m$ is a power generated under the m-th operation status of the second power supply, $\alpha$ is a coefficient corresponding to cost, and $\beta$ is a power adjustment coefficient under the first condition data.

7. The system for the grid connection management of the renewable energy generation according to claim 6, in the status acquisition unit, the operating condition data is divided into a first condition data and a second condition data according to situation of the load, wherein the first condition data is working condition data under a first load, and the second condition data is working condition data under a second load, and the first load is greater than the second load;
the first power supply is a conventional power station power supply, and the second power supply is a renewable energy power supply.

8. The system for the grid connection management of the renewable energy generation according to claim 7, $$f_1 = \alpha cost + \beta \Sigma_{m=1}^{M} \Sigma_{i=1}^{N} P^m (C_u u_i^{m,t} + C_d d_i^{m,t})$$

$u_i^{m,t} d_i^{m,t}$
the second optimal control model is as follows:

$$f_2 = \phi comp + \lambda \Sigma_{q=1}^{Q} \Sigma_{i=1}^{N} P^q (C_u u_i^{q,t} + C_d d_i^{q,t}),$$

where comp is a cost value of the first power supply, the second power supply, and the load under the second condition data, and q is a quantity value of second power supply in different operation status under the second condition data, where q=1, 2, . . . , Q, Q is a total number of operation status; N is a total number of units in the first power supply, i represents an i-th unit, where i=1, 2, . . . , N; $u_i^{q,t}$ is a positive output feedback value of the i-th unit in a period t under a q-th operation status, $d_i^{q,t}$ is a negative output feedback value of the i-th unit in the period t under the q-th operation status, $C_u$ is an adjustment coefficient of the positive output feedback value, $C_d$ is an adjustment coefficient of the negative output feedback value, $P^q$ is a generating power under the q-th operation status, $\phi$ is a coefficient corresponding to comp, $\lambda$ is a power adjustment coefficient under the second condition data.

9. The system for the grid connection management of the renewable energy generation according to claim 8, in the analysis and the switching unit, analyzing stability when the first optimal control model is switched to the second optimal control model through a preset algorithm according to the monitoring result includes:

filtering results of the grid connection management status of the first optimal control model, and taking J acquisition results in switching period obtained from the filtering as a first matrix J; filtering results of grid connection management status of the second optimal control model, and taking K acquisition results in switching period obtained by filtering as a second matrix K;

the corresponding model of the preset algorithm is as follows:

$$F = \frac{\sum_{j=1}^{J} J \sum_{k=1}^{K} K}{J * K},$$

where j=1, 2, . . . J, k=1, 2, . . . , K, F represents a smoothness of the grid connection management status when switching from the first optimal control model to the second optimal control model.

* * * * *